US011877133B2

(12) United States Patent
Laaksonen et al.

(10) Patent No.: US 11,877,133 B2
(45) Date of Patent: Jan. 16, 2024

(54) AUDIO OUTPUT USING MULTIPLE DIFFERENT TRANSDUCERS

(71) Applicant: Nokia Technologies Oy, Espoo (FI)

(72) Inventors: Lasse Juhani Laaksonen, Tampere (FI); Jussi Leppänen, Tampere (FI); Miikka Vilermo, Siuro (FI); Arto Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 32 days.

(21) Appl. No.: 17/521,507

(22) Filed: Nov. 8, 2021

(65) Prior Publication Data

US 2022/0167087 A1 May 26, 2022

(30) Foreign Application Priority Data

Nov. 25, 2020 (EP) .................................... 20209790

(51) Int. Cl.
*H04R 5/033* (2006.01)

(52) U.S. Cl.
CPC ......... *H04R 5/033* (2013.01); *H04R 2460/13* (2013.01)

(58) Field of Classification Search
None
See application file for complete search history.

(56) References Cited

U.S. PATENT DOCUMENTS

| | | | |
|---|---|---|---|
| 9,432,761 B2 | 8/2016 | Gautama | |
| 9,930,436 B2 | 3/2018 | Fukuda | |
| 10,547,930 B1 | 1/2020 | Zhong et al. | |
| 10,728,649 B1 | 7/2020 | Holman | |
| 2010/0105447 A1* | 4/2010 | Sibbald | G10K 11/17857 381/71.6 |
| 2012/0033818 A1 | 2/2012 | De Poortere | |
| 2013/0051585 A1 | 2/2013 | Karkkainen et al. | |
| 2018/0167733 A1* | 6/2018 | Kaetel | H04R 5/02 |

FOREIGN PATENT DOCUMENTS

| | | |
|---|---|---|
| DE | 2415816 A1 | 10/1975 |
| DE | 102017126432 A1 | 5/2019 |
| JP | S6350195 A | 3/1988 |

OTHER PUBLICATIONS

Extended European Search Report received for corresponding European Patent Application No. 20209790.3, dated Mar. 31, 2021, 8 pages.

* cited by examiner

*Primary Examiner* — Kenny H Truong
(74) *Attorney, Agent, or Firm* — ALSTON & BIRD LLP

(57) ABSTRACT

A head-mounted audio output apparatus comprising:
a hybrid audio system comprising multiple transducers, wherein the hybrid audio system is configured to render sound for a user of the apparatus into different audio output channels using different associated transducers;
means for automatically changing a cut-off frequency of a first one of the audio output channels in dependence upon the transducer associated with the first one of the audio output channels.

20 Claims, 5 Drawing Sheets

AUDIO OUTPUT USING MULTIPLE DIFFERENT TRANSDUCERS

TECHNOLOGICAL FIELD

Embodiments of the present disclosure relate to providing audio output using multiple different transducers.

BACKGROUND

An audio output apparatus can be configured to render sound for a user of the apparatus into different audio output channels using different associated transducers.

The different transducers can, for example, be used for different specific frequency ranges. A filter can be used to route audio signals below a cross-over frequency to a transducer optimised for lower frequency audio output and route audio signals above the cross-over frequency to a different transducer optimised for higher frequency audio output.

The cross-over frequency is fixed by the different specific frequency ranges of the transducers used.

If the transducers are replaced with transducers for use with different specific frequency ranges, then the filter is replaced with one that has a fixed cross-over frequency optimised for the new transducers.

BRIEF SUMMARY

According to various, but not necessarily all, embodiments there is provided a head-mounted audio output apparatus comprising:

- at least one hybrid audio system comprising multiple transducers, wherein the hybrid audio system is configured to render sound for a user of the head-mounted audio output apparatus into different audio output channels using different associated transducers of the multiple transducers;
- means for changing a cut-off frequency of at least a first one of the audio output channels in dependence upon the transducer associated with the first one of the audio output channels.

In some but not necessarily all examples, the means for automatically changing a cut-off frequency of at least the first one of the audio output channels is configured to change the cut-off frequency of the first one of the audio output channels in dependence on at least a sensed environmental value at a position of the head-mounted audio output apparatus.

In some but not necessarily all examples, the means for automatically changing a cut-off frequency of at least the first one of the audio output channels is configured to automatically change a cross-over frequency of the first one of the audio output channels and a second one of the audio output channels.

In some but not necessarily all examples, the means for automatically changing a cut-off frequency of at least the first one of the audio output channels is configured to increase the cross-over frequency between a lower frequency audio output channel and a higher frequency audio output channel such that a bandwidth of the lower frequency audio output channel increases and a bandwidth of the higher frequency audio output channel decreases.

In some but not necessarily all examples, the hybrid audio system is configured to render sound for the user of the apparatus into a bone-conduction audio output channel using an associated bone-conduction transducer and an air-conduction audio output channel using an associated air-conduction transducer, wherein the first one of the audio output channels is the bone-conduction audio output channel.

In some but not necessarily all examples, the hybrid audio system is configured to render sound for a left ear of the user into a first audio output channel using an associated first transducer and into a second audio output channel using an associated second transducer and is configured to render sound for a right ear of the user into a third audio output channel using an associated third transducer and into a fourth audio output channel using an associated fourth transducer.

In some but not necessarily all examples, a first set of different audio output channels comprising the first audio output channel and the second audio output channel and a second set of different audio output channels comprising the third audio output channel and the fourth audio output channel are controlled to render one or more audio objects.

In some but not necessarily all examples, the first audio output channel, the second audio output channel, the third audio output channel and the fourth audio output channel are controlled to render one or more audio objects.

In some but not necessarily all examples, the means for automatically changing a cut-off frequency of at least the first one of the audio output channels is configured to automatically change the cut-off frequency of the first one of the audio output channels in dependence upon a dynamic assessment of one or more of:

- one or more properties of the audio output channels;
- audio content; and/or
- an environment of the user.

In some but not necessarily all examples, the means for automatically changing a cut-off frequency of at least the first one of the audio output channels is configured to automatically change the cut-off frequency of the first one of the audio output channels to increase a bandwidth of the first one of the audio output channels, in dependence upon impairment of a second one of the audio output channels.

In some but not necessarily all examples, the means for automatically changing a cut-off frequency of at least the first one of the audio output channels is configured to automatically change the cut-off frequency of the first one of the audio output channels to optimize for hearability.

In some but not necessarily all examples, the means for automatically changing a cut-off frequency of at least the first one of the audio output channels is configured to automatically change the cut-off frequency of the first one of the audio output channels in dependence upon spectral analysis of exterior noise.

In some but not necessarily all examples, the means for automatically changing a cut-off frequency of at least the first one of the audio output channels is configured to automatically change the cut-off frequency of the first one of the audio output channels in dependence upon a dynamic assessment of one or more of sensor output; noise; content for rendering.

In some but not necessarily all examples, the means for automatically changing a cut-off frequency of at least the first one of the audio output channels is configured to automatically change the cut-off frequency of the first one of the audio output channels in dependence upon at least one of:

(i) dynamic assessment of content for rendering as private content and a local environment as a public environment;

(ii) dynamic assessment of content for rendering as comprising speech and a local environment as a noisy environment;

(iii) dynamic assessment of a local environment as an environment subject to wind noise; or (iv) dynamic assessment of content for rendering as spatial audio content to be rendered from different directions and assessment of a local environment as a noisy environment in some but not all directions.

According to various, but not necessarily all, embodiments there is provided a computer program that when run on at least one processor of an audio output apparatus comprising a hybrid audio system comprising multiple transducers configured to render sound for a user of the head-mounted audio output apparatus into different audio output channels, causes an automatic change of a cut-off frequency of one or more audio output channels in dependence upon the one or more transducers associated with the respective one or more audio output channels.

According to various, but not necessarily all, embodiments there is provided a method comprising: using a hybrid audio system comprising multiple transducers to render sound to a user into different audio output channels, wherein a first audio output channel, associated with a first transducer, has a first cut-off frequency and wherein a second audio output channel, associated with a second transducer different to the first transducer, has a second cut-off frequency;

changing the first cut-off frequency to a different first cut-off frequency and changing the second cut-off frequency to a different second cut-off frequency, wherein the change of the first cut-off frequency to the different first cut-off frequency is different from a change of the second cut-off frequency to the different second cut-off frequency;

using the hybrid audio system comprising the multiple transducers to render sound to the user into different audio output channels, wherein the first audio output channel, associated with the first transducer, has the different first cut-off frequency and wherein the second audio output channel, associated with the second transducer different to the first transducer, has the different second cut-off frequency.

According to various embodiments there is provided examples as claimed in the appended claims.

BRIEF DESCRIPTION

Some examples will now be described with reference to the accompanying drawings in which.

DETAILED DESCRIPTION

Figure 1:
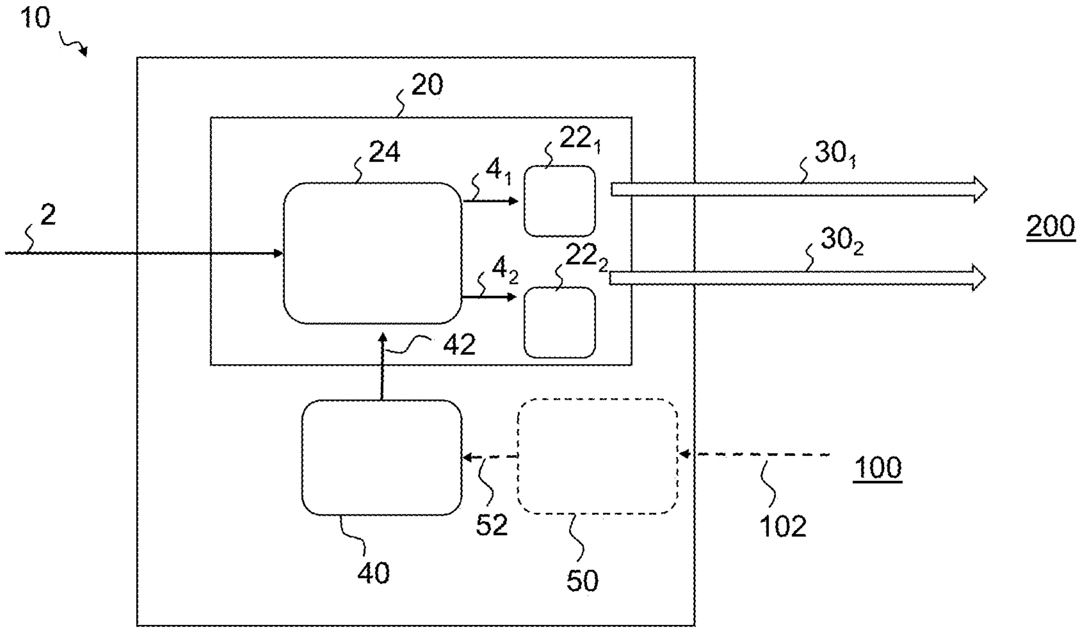
FIG. 1 shows an example of the subject matter described herein.

FIG. 1 illustrates an example of an audio output apparatus 10 comprising a hybrid audio system 20. The hybrid audio system 20 comprises multiple transducers 22, including a first transducer $\mathbf{22}_1$ and a second transducer $\mathbf{22}_2$. The hybrid audio system 20 is configured to render sound for a user 200 of the apparatus 10 into different audio output channels 30 using different associated transducers 22. The different audio output channels 30 include a first audio output channel $\mathbf{30}_1$ associated with the first transducer $\mathbf{22}_1$ and a second audio output channel $\mathbf{30}_2$ associated with the second transducer $\mathbf{22}_2$. The first transducer $\mathbf{22}_1$ renders sound for the user 200 into the associated first audio output channel $\mathbf{30}_1$. The second transducer $\mathbf{22}_2$ renders sound for the user 200 into the associated second audio output channel $\mathbf{30}_2$.

In at least some examples, the method of transduction used by the first transducer $\mathbf{22}_1$ and the second transducer $\mathbf{22}_2$ are different. In one example, the first transducer $\mathbf{22}_1$ is configured to produce vibrations in bone that transfer sound via a bone-conduction audio output channel $\mathbf{30}_1$. In this example, or other examples, the second transducer $\mathbf{22}_2$ is configured to produce pressure waves in air that transfer sound via an air-conduction audio output channel $\mathbf{30}_2$.

The apparatus 10 comprises means for automatically changing a cut-off frequency of at least the first audio output channel $\mathbf{30}_1$ in dependence upon the transducer associated with the first audio output channel $\mathbf{30}_1$ (the first transducer $\mathbf{22}_1$).

The apparatus 10 can also comprise means for automatically changing a cut-off frequency of the second audio output channel $\mathbf{30}_2$ in dependence upon the transducer associated with the second audio output channel $\mathbf{30}_2$ (the second transducer $\mathbf{22}_2$).

The means for automatically changing a cut-off frequency of the first audio output channel $\mathbf{30}_1$ and a cut-off frequency of the second audio output channel $\mathbf{30}_2$ can comprise a filter 24 and a filter controller 40. The filter 24 filters an audio signal 2 and produces a first audio signal $\mathbf{4}_1$ for driving the first transducer $\mathbf{22}_1$ and produces a second audio signal $\mathbf{4}_2$ for driving the second transducer $\mathbf{22}_2$. The filter characteristics of the filter 24 are controlled by control signal 42 provided by the filter controller 40.

The filter controller 40 is configured to control the filter 24 to change a cut-off frequency of the first audio signal $\mathbf{4}_1$ and therefore control the cut-off frequency of the first audio output channel $\mathbf{30}_1$.

The filter controller 40 is configured to control the filter 24 to change a cut-off frequency of the second audio signal $\mathbf{4}_2$ and therefore control the cut-off frequency of the second audio output channel $\mathbf{30}_2$.

For example, if the first audio signal $\mathbf{4}_1$ is filtered to be a lower frequency signal, the filter controller 40 can control the filter 24 to change an upper cut-off frequency $f_{uco}$ of the first audio signal $\mathbf{4}_1$.

For example, if the second audio signal $4_2$ is filtered to be a higher frequency signal, the filter controller 40 can control the filter 24 to change a lower cut-off frequency $f_{lco}$ of the second audio signal $4_2$.

In some but not necessarily all examples, the filter controller 40 is configured to automatically change a cut-off frequency of the first audio output channel $30_1$ in dependence on a sensed environmental value 52 at a position of the audio output apparatus 10. In some but not necessarily all examples, the filter controller 40 is configured to automatically change a cut-off frequency of the second audio output channel $30_2$ in dependence on the or a sensed environmental value 52.

In the illustrated example, the apparatus 10 optionally comprises a sensor 50 configured to sense a parameter 102 of an exterior environment 100, at the position of the audio output apparatus 10, and provide the sensed environmental value 52 to the filter controller 40.

In some but not necessarily all examples, the apparatus 10 is a worn apparatus. In some but not necessarily all examples, the apparatus 10 is a head-mounted apparatus.

A head-mounted apparatus can, for example, be configured as an over-ear apparatus, an on-ear apparatus, an in-ear apparatus, or as a bud or pod.

One example of a head-mounted apparatus is headset. One example of a head-mounted apparatus is headphones. One example of a head-mounted apparatus is a head-worn mediated reality apparatus such as virtual reality (see-display) or augmented reality (see-through display) apparatus.

Figure 10:
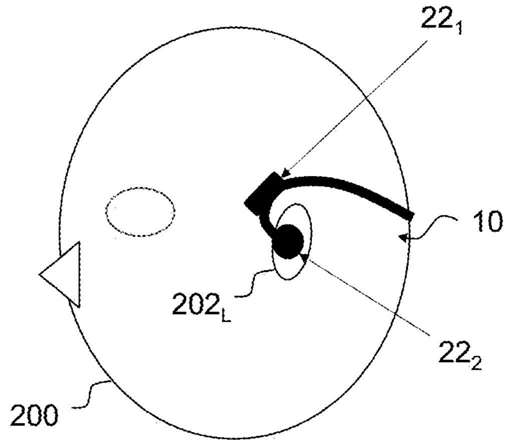
FIG. 10 shows another example of the subject matter described herein.

An example of a head-mounted audio output apparatus 10 is illustrated in FIG. 10. In this example, the first transducer $22_1$ is a bone-conduction transducer configured to render sound to a left ear $202_L$ of the user 200 of the apparatus 10 via a bone-conduction audio output channel $30_1$ (not illustrated in FIG. 10). The second transducer $22_2$ is an air-conduction transducer configured to render sound to the left ear $202_L$ of the user 200 of the apparatus 10 via an air-conduction audio output channel $30_2$ (not illustrated in FIG. 10).

Figure 2A:
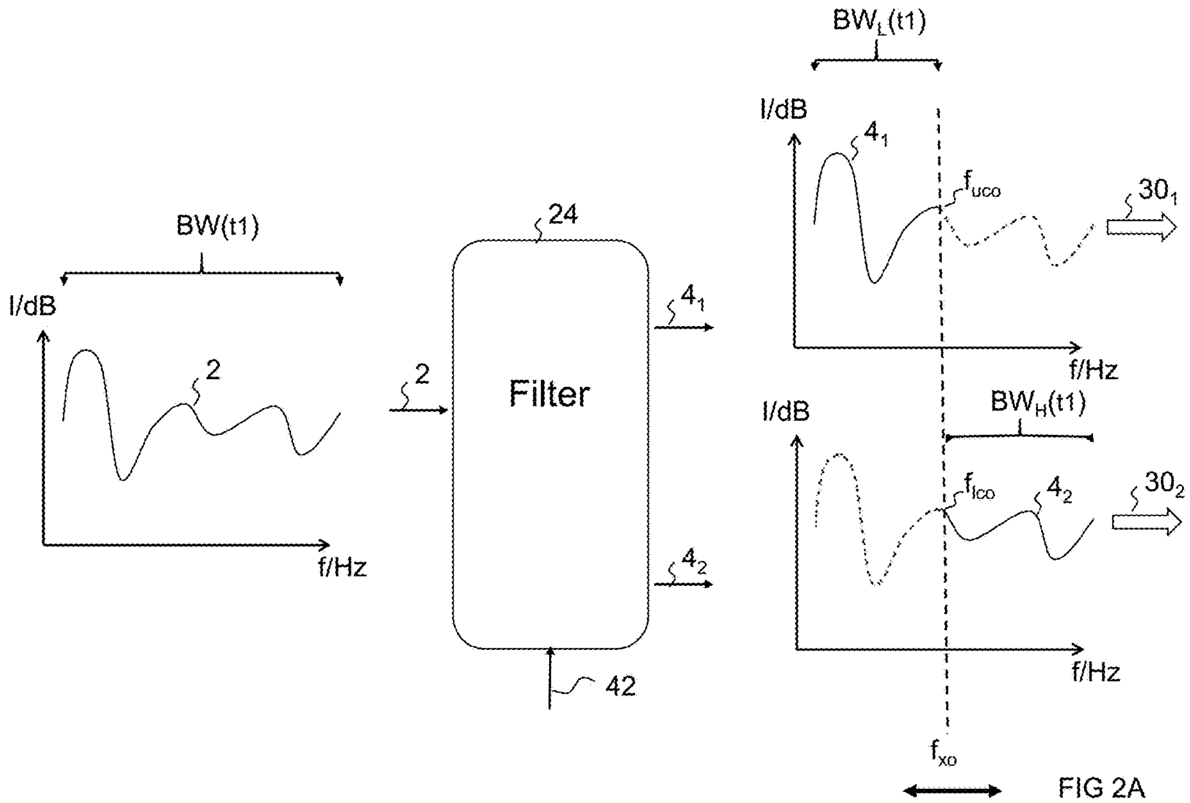
FIG. 2A shows another example of the subject matter described herein.
Figure 2B:
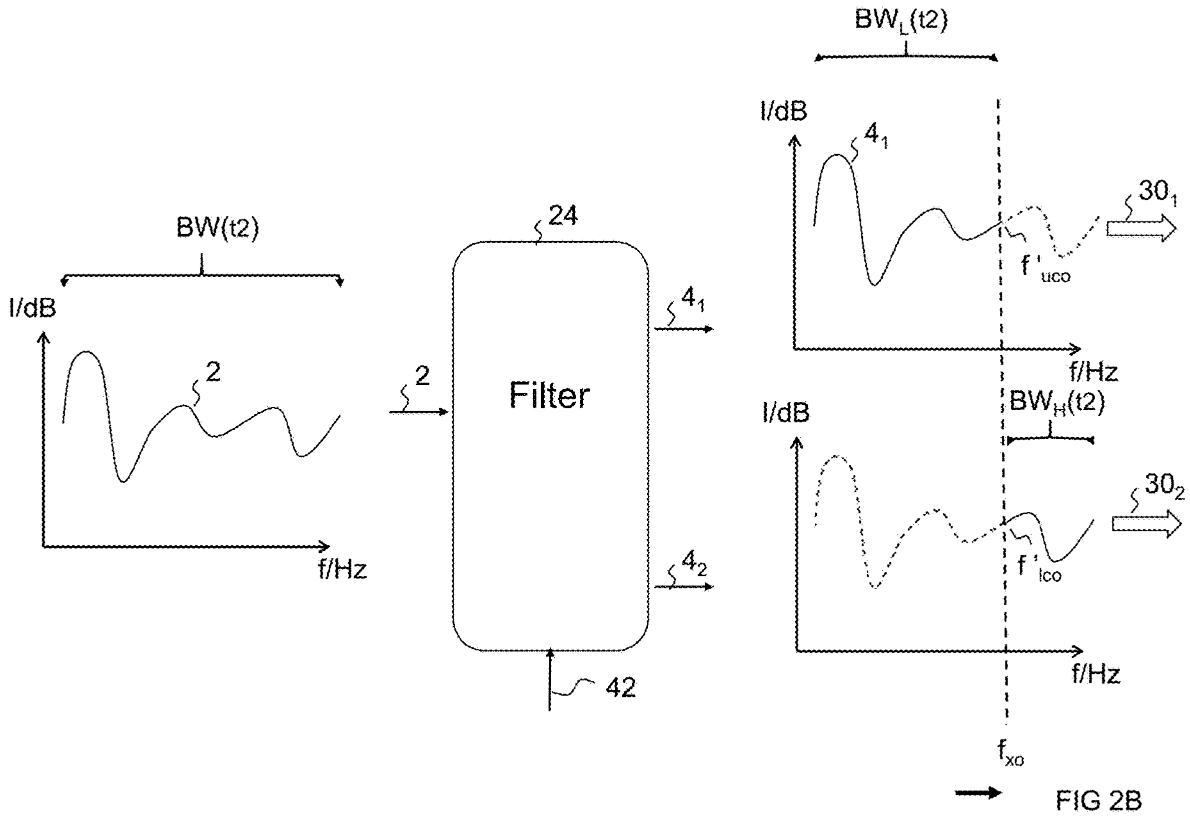
FIG. 2B shows another example of the subject matter described herein.

As illustrated in FIGS. 2A and 2B, in some but not necessarily all examples, the filter controller 40 is configured to automatically change, using control signal 42, a cross-over frequency associated with the first audio output channel $30_1$ and the second audio output channel $30_2$. For example, the filter 24 automatically adapts a cross-over frequency of the first audio output channel $30_1$ and the second audio output channel $30_2$ in response to the control signal 42.

In some but not necessarily all examples, the control signal 42 is automatically changed in dependence on a sensed environmental value 52 at a position of the audio output apparatus 10.

The filter 24 splits a bandwidth BW of the audio signal 2 into two contiguous, mostly non-overlapping parts for the different audio output channels $30_1$, $30_2$. The two parts are a lower frequency part $BW_L$ and a higher frequency part $BW_H$.

The first audio signal $4_1$ has been filtered to be a lower frequency signal. It has a bandwidth corresponding to the lower frequency part $BW_L$. The cross-over frequency $f_{xo}$ corresponds to an upper cut-off frequency $f_{uco}$ of the first audio signal $4_1$.

The second audio signal $4_2$ has been filtered to be a higher frequency signal. It has a bandwidth corresponding to the higher frequency part $BW_H$. The cross-over frequency $f_{xo}$ corresponds to a lower cut-off frequency $f_{lco}$ of the second audio signal $4_2$.

The filter 24 filters the audio signal 2 and produces the first audio signal $4_1$ for driving the first transducer $22_1$ and produces the second audio signal $4_2$ for driving the second transducer $22_2$. The filter characteristics of the filter 24 are controlled by control signal 42 provided by the filter controller 40.

The filter controller 40 is configured to control the filter 24 to change the cross-over frequency of the first audio signal $4_1$ and the second audio signal $4_2$. This determines the cross-over frequency between the first audio output channel $30_1$ and the second audio output channel $30_2$.

The cross-over frequency at time t1 (FIG. 2A) is increased at time t2 (FIG. 2B). This increases the bandwidth $BW_L$ of the lower frequency audio output channel $30_1$ and decreases the bandwidth $BW_H$ of the higher frequency audio output channel $30_2$.

FIGS. 2A and 2B illustrate an example of a method. The method uses features described previously with reference to FIG. 1. The method comprises, as illustrated in FIG. 2A at time t1, using a hybrid audio system 20 comprising multiple transducers 22 to render sound to a user 200 into different audio output channels 30, wherein a first audio output channel $30_1$, associated with a first transducer $22_1$, has a first cut-off frequency ($f_{uco}$) and wherein a second audio output channel $30_2$, associated with a second transducer $22_2$, different to the first transducer $22_1$, has a second cut-off frequency ($f_{lco}$).

In the transition from FIG. 2A, at time t1, to FIG. 2B at a later time t2, the method comprises changing the first cut-off frequency ($f_{uco}$) to a different first cut-off frequency ($f'_{uco}$) and changing the second cut-off frequency to a different second cut-off frequency ($f'_{lco}$), wherein the change of the first cut-off frequency ($f_{uco}$) to the different first cut-off frequency ($f'_{uco}$) (e.g. increase in upper frequency of passband, extension of lower frequency passband) is different from the change of the second cut-off frequency ($f_{lco}$) to the different second cut-off frequency ($f'_{lco}$) (e.g. increase in lower frequency of passband, contraction of higher frequency passband).

The method then comprises, as illustrated in FIG. 2B at time t2, using a hybrid audio system 20 comprising multiple transducers 22 to render sound to a user 200 into different audio output channels 30, wherein the first audio output channel $30_1$, associated with the first transducer $22_1$, has the different first cut-off frequency ($f'_{uco}$) and wherein the second audio output channel $30_2$, associated with the second transducer $22_2$, different to the first transducer $22_1$, has the different second cut-off frequency ($f'_{lco}$).

Figure 3:
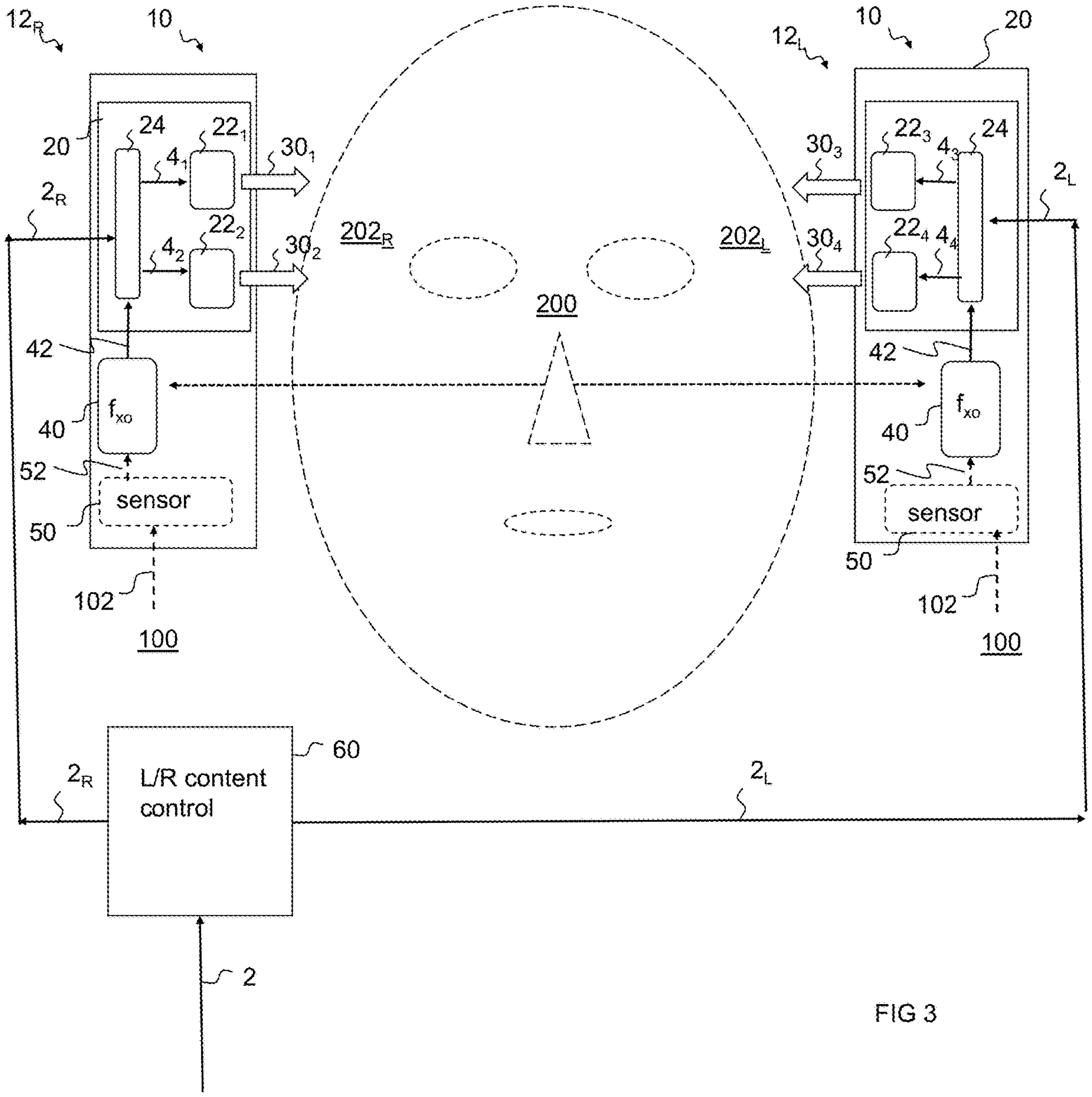
FIG. 3 shows another example of the subject matter described herein.

As illustrated in FIG. 3, in some examples, the hybrid audio system 20 is configured to render sound for a right ear $202_R$ of the user 200 into a first audio output channel $30_1$ using an associated first transducer $22_1$ and into a second audio output channel $30_2$ using an associated second transducer $22_2$ and is configured to render sound for a left ear $202_L$ of the user 200 into a third audio output channel $30_3$ using an associated third transducer $22_3$ and into a fourth audio output channel $30_4$ using an associated fourth transducer $22_4$.

There are two different hybrid transducers 22 per ear 202. An equivalent pair of different hybrid transducers 22 can be used for each ear.

In the illustrated example, but not necessarily all examples:

the first audio output channel $30_1$ is a bone-conduction audio output channel and the first transducer $22_1$ is a bone-conduction transducer;

the second audio output channel $30_2$ is an air-conduction audio output channel and the second transducer $22_2$ is an air-conduction transducer;

the third audio output channel $30_3$ is a bone-conduction audio output channel and the third transducer $22_3$ is a bone-conduction transducer;

the fourth audio output channel $30_4$ is an air-conduction audio output channel and the fourth transducer $22_4$ is an air-conduction transducer.

The first bone-conduction transducer $22_1$ and the third bone-conduction transducer $22_3$ can be the same or similar. A bone-conduction transducer is configured to conduct energy representing the respective audio signal $4_1$, $4_3$ to an ear 202 of the user 200 via the head bones of the user 200. An example of a bone-conduction transducer $22_1$, $22_3$ is an electromagnetically controlled mechanical vibrator.

The second air-conduction transducer $22_2$ and the fourth air-conduction transducer $22_4$ can be the same or similar. An air-conduction transducer is configured to conduct energy representing the respective audio signal $4_2$, $4_4$ into an ear 202 of the user 200 via the open ear canal of the user 200. An example of an air-conduction transducer $22_2$, $22_4$ is an electromagnetically controlled diaphragm.

The apparatus 10 comprises a left part $12_L$ and a right part $12_R$. The left part $12_L$ is positioned in, at or near a left ear $202_L$ of the user 200. The right part $12_R$ is positioned in, at or near a right ear $202_R$ of the user 200.

Operation of the left part $12_L$ of the apparatus 10 can be the same as operation of the apparatus 10 as described in relation to FIGS. 1 and 2A & 2B.

Operation of the right part $12_R$ of the apparatus 10 can be the same as operation of the apparatus 10 as described in relation to FIGS. 1 and 2A & 2B.

In the right part $12_R$, the hybrid audio system 20 is configured to render sound for a right ear $202_R$ of the user 200 of the apparatus 10 into a first audio output channel $30_1$ associated with the first transducer $22_1$ and a second audio output channel $30_2$ associated with the second transducer $22_2$. The filter 24 filters a right-ear audio signal $2_R$ and produces a first audio signal $4_1$ for driving the first transducer $22_1$ and produces a second audio signal $4_2$ for driving the second transducer $22_2$. The filter characteristics of the filter 24 are controlled by control signal 42 provided by the filter controller 40.

A sensor 50 can be configured to sense a parameter 102, for example a parameter of an exterior environment 100 at the position of the right part $12_R$ of the audio output apparatus 10, and provide the sensed parameter e.g. environmental value 52 to the filter controller 40.

The filter controller 40 is configured to control the filter 24 to change a cross-over frequency $f_{xo}$ of the first audio signal $4_1$ and the second audio signal $4_2$. The cross-over frequency $f_{xo}$ corresponds to an upper cut-off frequency $f_{uco}$ of the lower frequency first audio signal $4_1$ and the lower cut-off frequency $f_{lco}$ of the higher frequency second audio signal $4_2$. The change in the cross-over frequency is dependent on the sensed environmental value 52.

In the left part $12_L$, the hybrid audio system 20 is configured to render sound for a left ear $202_L$ of the user 200 of the apparatus 10 into a third audio output channel $30_3$ associated with the third transducer $22_3$ and a fourth audio output channel $30_4$ associated with the fourth transducer $22_4$. The filter 24 filters a left-ear audio signal $2_L$ and produces a third audio signal $4_3$ for driving the third transducer $22_3$ and produces a fourth audio signal $4_4$ for driving the fourth transducer $22_4$. The filter characteristics of the filter 24 are controlled by control signal 42 provided by the filter controller 40.

A sensor 50 can be configured to sense a parameter 102, for example a parameter of an exterior environment 100 at the position of the left part $12_L$ of the audio output apparatus 10, and provide the sensed parameter e.g. environmental value 52 to the filter controller 40.

The filter controller 40 is configured to control the filter 24 to change a cross-over frequency $f_{xo}$ of the third audio signal $4_3$ and the fourth audio signal $4_4$. The cross-over frequency $f_{xo}$ corresponds to an upper cut-off frequency $f_{uco}$ of the lower frequency third audio signal $4_3$ and the lower cut-off frequency $f_{lco}$ of the higher frequency fourth audio signal $4_4$. The change in the cross-over frequency $f_{xo}$ is dependent on the sensed environmental value 52.

In some examples, the filter controller 40 is configured to control the filter 24 to change a cross-over frequency $f_{xo}$ of the first audio signal $4_1$ (first audio output channel $30_1$) and the second audio signal $4_2$ (second audio output channel $30_2$) in dependence upon on the sensed environmental value 52 at the left part $12_L$ and the right part $12_R$.

In some examples, the filter controller 40 is configured to control the filter 24 to change a cross-over frequency $f_{xo}$ of the third audio signal $4_3$ (third audio output channel $30_3$) and the fourth audio signal $4_4$ (fourth audio output channel $30_4$) in dependence upon on the sensed environmental value 52 at the right part $12_R$ and the left part $12_L$.

In some examples, a separate filter controller 40 is provided in the left part $12_L$ and also in the right part $12_R$. The separate filter controllers 40, can for example, communicate.

In some examples, a single filter controller 40 is provided for controlling separately filters 24 in the left part $12_L$ and in the right part $12_R$.

An audio content controller 60 processes an audio signal 2 to produce the left-ear audio signal $2_L$ and the right-ear audio signal $2_R$. In some but not necessarily all examples, the audio content controller 60 is comprised in the apparatus 10. In other examples, the audio content controller 60 is not comprised in the apparatus 10.

A first set of different audio output channels $30_1$, $30_2$ are rendered using different associated transducers $22_1$, $22_2$ to provide sound to the right ear $202_R$. A second set of different audio output channels $30_3$, $30_4$ are rendered using different associated transducers $22_3$, $22_4$ to provide sound to the left ear $202_L$.

As illustrated in FIGS. 4A & 4B and FIGS. 5A & 5B, in some but not necessarily all examples, the different audio output channels $30_1$, $30_2$ of the first set are controlled to represent a first spatial audio object $70_R$, $70_1$ and the different audio output channels $30_3$, $30_4$ of the second set are controlled to represent a second spatial audio object $70_L$, $70_2$.

In this example, each set of audio output channels comprises a bone-conduction audio output channel and an air-conduction audio output channel.

Figure 4A:
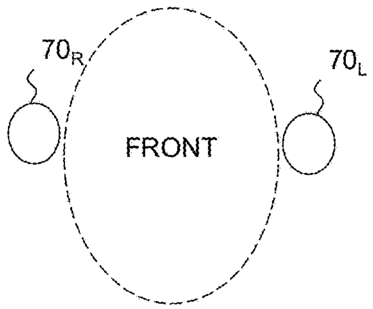
FIGS. 4A & 4B show another example of the subject matter described herein.
Figure 4B:
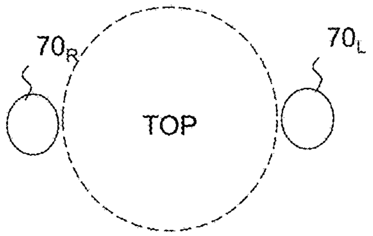

In the example, illustrated in FIGS. 4A & 4B, the first set of audio output channels provides stereo output for the right ear and the second set of audio output channels provides stereo output for the left ear. The first audio object $70_R$ is the right-ear stereo loudspeaker located adjacent the right-ear $202_R$. The second audio object $70_L$ is the left-ear stereo loudspeaker located adjacent the left-ear $202_L$. FIG. 4A illustrates a front perspective and FIG. 4B illustrates a top perspective.

Figure 5A:
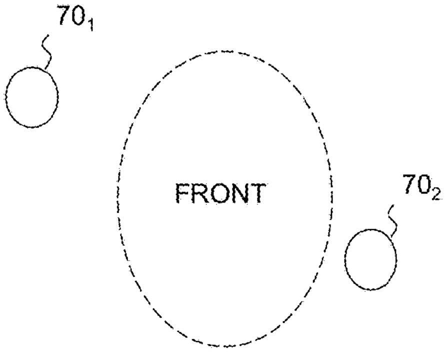
FIGS. 5A & 5B show another example of the subject matter described herein.
Figure 5B:
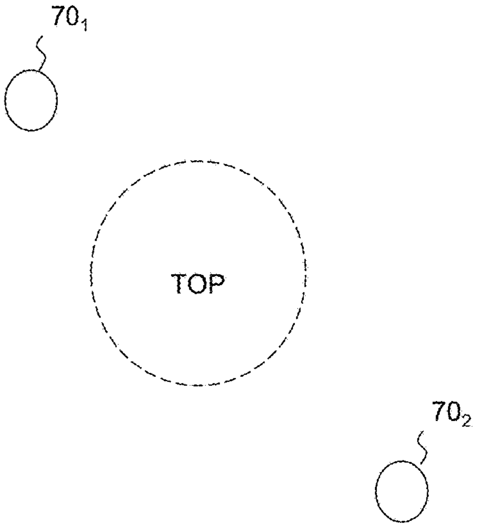

In the example, illustrated in FIGS. 5A & 5B, the first set of audio output channels provides binaural output for the right ear and the second set of audio output channels provides binaural output for the left ear. The combination of the first set of audio output channels and the second set of audio output channels locates a first spatial audio object $\mathbf{70}_1$ at a distance and bearing from the user 200. Optionally, the combination of the first set of audio output channels and the second set of audio output channels locates a second spatial audio object $\mathbf{70}_2$ at a distance and bearing from the user 200. FIG. 5A illustrates a front perspective and FIG. 5B illustrates a top perspective. The first spatial audio object $\mathbf{70}_1$ can be a virtual loudspeaker (sound source). The second spatial audio object $\mathbf{70}_2$ can be a virtual loudspeaker (sound source).

In other examples the set of audio output channels may provide, mono, stereo or any other type of audio that can be used with the apparatus 10.

In at least some examples, the filter controller 40 of the apparatus 10 is configured to automatically change the cut-off frequencies of audio output channels 30 in dependence upon a dynamic assessment of parameters that relate to impairment of the audio output channels 30.

For example, the filter controller 40 is configured to automatically change the cut-off frequency of a lower frequency audio output channel $\mathbf{30}_1/\mathbf{30}_3$ for an ear to increase a bandwidth (increase the upper cut-off frequency $f_{uco}$) of that lower frequency audio output channel $\mathbf{30}_1/\mathbf{30}_3$, in dependence upon impairment of the higher frequency audio output channels $\mathbf{30}_2/\mathbf{30}_4$ for the same ear.

For example, the filter controller 40 is configured to automatically change the cross-over frequency $f_{xo}$ between a lower frequency audio output channel $\mathbf{30}_1/\mathbf{30}_3$ and a higher frequency audio output channel $\mathbf{30}_2/\mathbf{30}_4$ for the same ear, in dependence upon impairment of the respective higher frequency audio output channel $\mathbf{30}_2/\mathbf{30}_4$ for the same ear.

Thus, more information (larger bandwidth) can be used for a less impaired audio channel.

The impairment can, for example, be based on hearability. The automatic change in a cut-off frequency (or cross-over frequency) optimizes or improves hearability.

Figure 6A:
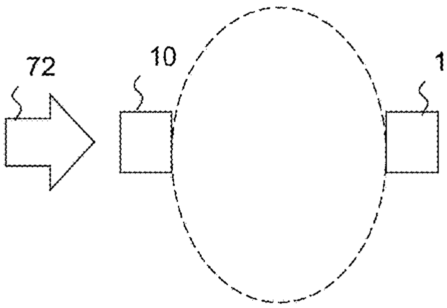
FIG. 6A shows another example of the subject matter described herein.

In the example illustrated in FIG. 6A, an exterior noise 72 in the exterior environment 100 reduces hearability to the user 200 via an air-conduction audio output channel and causes an impairment to the user 200. The exterior noise can for example be wind, machinery or other noises. The impairment can be detected by using a sensor 50 (not illustrated) to sense the environment 100. For example, a microphone can listen to sounds in the exterior environment 100 and an impairment can be detected when the energy density per Hz exceeds a threshold within a defined spectral range. Thus, an impairment can be detected when the exterior noise is a loud higher frequency noise, for example, such as wind.

The apparatus 10 responds to detection of the impairment by automatically changing the cut-off (cross-over) frequency so that higher frequency audio signals are provided via the bone-conduction audio output channel rather than the air-conduction audio output channel. The threshold used to detect impairment can, for example, be based on one or more properties of the audio output channels 30 such as energy spectrum and/or audio content (e.g. speech, private, . . . ).

Thus, the apparatus 10 can be configured to automatically change the cut-off frequency of an audio output channel in dependence upon a dynamic assessment of one or more of: one or more properties of the audio output channels;

audio content; and/or an environment of the user.

Figure 6B:
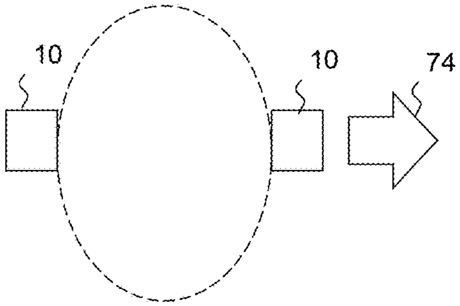
FIG. 6B shows another example of the subject matter described herein.

In the example illustrated in FIG. 6B, noise 74 leaking from the apparatus 10 via an air-conduction audio output channel increasing hearability to a potential eavesdropper nearby (not illustrated) and causes an impairment. The impairment can be detected by using a sensor 50 (not illustrated) to sense a nearby potential eavesdropper or to sense that the apparatus 10 is in a public environment 100 (rather than a private environment).

The apparatus 10 responds to detection of the impairment by automatically changing the cut-off (cross-over) frequency so that higher frequency audio signals are provided via the bone-conduction audio output channel rather than the air-conduction audio output channel to improve privacy and reduce the likelihood of being overheard. The detection of such a privacy impairment can be activated when the audio signals rendered to the user comprise speech or other private content and/or when the energy spectrum of the audio signal exceeds a threshold value.

Thus, the assessment of impairment is dynamic and can be based upon:

one or more properties of the audio output channels 30 such as energy spectrum and/or audio content (e.g. speech, private, . . . ) and/or an environment 100 of the user 200.

In one use case, the cut-off frequency of a first audio output channel 30 is automatically changed in dependence upon a dynamic assessment of content for rendering as private content and a local environment as a public environment. More information can be transferred to the less leaky channel. For example, by increasing the upper cut-off frequency for the bone conduction channel and the lower cut-off frequency for the air conduction channel.

In one use case, the cut-off frequency of a first audio output channel 30 is automatically changed in dependence upon a dynamic assessment of content for rendering as comprising speech and a local environment as a noisy environment.

More information can be transferred to the less noisy channel. For example, by increasing the upper cut-off frequency for the bone conduction channel and optionally the lower cut-off frequency for air conduction channel.

In one use case, the cut-off frequency of a first audio output channel 30 is automatically changed in dependence upon a dynamic assessment of a local environment 100 as an environment subject to wind noise. More information can be transferred to the less noisy channel. For example, by increasing the upper cut-off frequency for the bone conduction channel and optionally the lower cut-off frequency for the air conduction channel.

In one use case, the cut-off frequency of a first audio output channel 30 is automatically changed in dependence upon a dynamic assessment of content for rendering as spatial audio content to be rendered from different directions and assessment of a local environment as a noisy environment in some but not all directions. More information can be transferred to the less noisy conduction channel. For example, by increasing the upper cut-off frequency (or cross-over frequency) for the bone-conduction channel(s) associated with the spatial audio channel with noise.

Thus, the apparatus 10 can be configured to automatically change the cut-off frequency of an audio output channel in dependence upon a dynamic assessment of one or more of: sensor output; noise; content for rendering.

Figure 7:
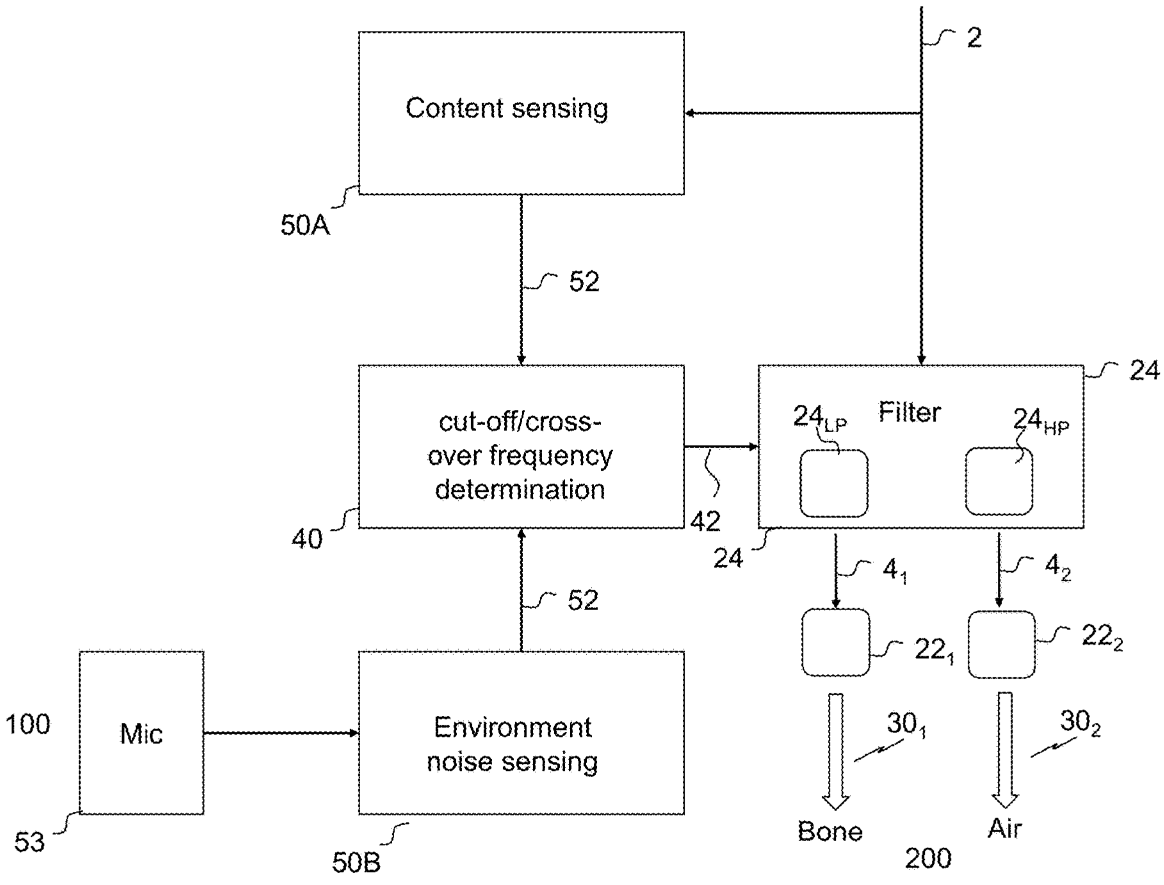
FIG. 7 shows another example of the subject matter described herein.

FIG. 7 illustrates an example of an apparatus 10 previously described, with both a bone-conduction transducer $\mathbf{22}_1$ and an air-conduction transducer $\mathbf{22}_2$. Similar references are used for similar features.

The apparatus 10 can be a headset for example as illustrated in FIG. 10.

A filtered part $4_1$ of the audio signal 2 is routed to the bone-conduction transducer $22_1$ and a differently filtered part $4_2$ of the audio signal 2 is routed to the air-conduction transducer $22_2$. This can be done, for example, by applying a low-pass filter $24_{LP}$ to the audio signal 2 to produce the audio signal $4_1$ going to the bone-conduction transducer $22_1$ and by applying a high-pass filter $24_{LP}$ to the audio signal 2 to produce the audio signal $4_2$ going to the air-conduction transducer $22_2$. Frequencies above a certain threshold ($f_{uco}$) are filtered from the audio signals $4_1$ going to the bone-conduction transducer $22_1$ and frequencies below a certain threshold ($f_{lco}$) are filtered from the audio signals $4_2$ going into the air-conduction transducer $22_2$. The filters $2_{4P}$, $24_{LP}$ can be designed so that frequencies below a certain threshold (the cross-over frequency $f_{xo}$) are filtered from the audio signals $4_2$ going into the air-conduction transducer $22_2$ and frequencies above this same threshold $f_{xo}$ are filtered from the audio signal $4_1$ going to the bone-conduction transducer $22_1$.

The apparatus 10 can be used in different environments 100 and the audio signals 2 can be used to render various kinds of different content.

The apparatus 10 does not use a fixed cut-off frequency (or cross-over frequency), and therefore mitigates a sub-optimal user experience.

The cut-off/cross-over frequency can be set low such that a user 200, listening to audio in a quiet environment 100, hears high bandwidth audio via the air-conduction audio output channel $30_2$ and can be set higher in a noisy environment 100 (e.g. wind noise, construction noise, engine noise . . . ) such that a user 200 listening hears a higher bandwidth via the bone-conduction audio output channel $30_1$.

The adaptive cut-off/cross-over frequency can be used for:

- audio signals 2 for spatial audio content;
- noisy environments 100 (a higher cross-over frequency can be used as the user 200 can hear the bone-conduction audio output channel $30_1$ but can't hear the acoustic air-conduction audio output channel $30_2$);
- audio signals 2 for private content (an optimal privacy cross-over frequency is where much/all of the audio signal 2 is rendered over the bone-conduction audio output channel $30_1$ and the remaining part of the audio signal 2 is rendered over the air-conduction audio output channel $30_2$, which may be heard by other persons in the environment 100, is unintelligible;
- audio signals 2 that require high quality audio can be rendered with a low cross-over frequency; notification signals and/or control signals can be rendered with a lower cross-over frequency.

An optimal cut-off/cross-over frequency can be selected based on the user's environment 100 and/or the content (or content type) of the audio signals 2 rendered to the user 200. The cut-off/cross-over frequency can be determined based on the type of content rendered and/or the environment 100.

When spatial audio content is being rendered to the user 200 via audio signals 2, the cut-off/cross-over frequency can be applied in a direction specific manner. The cut-off/cross-over frequency for a particular direction can be dependent upon the environment 100 (e.g. noise) in that direction and/or the content (or content type) rendered to the user 200 from that direction based on the audio signals 2.

The directionality of the cut-off/cross-over frequency can be dependent on which audio sources are heard from which direction and from which direction environmental sounds (noise) is heard by the user. The directionality can be taken into account by applying:

a) different cut-off/cross-over frequency for audio sources in different directions. For example, a filter 24 can be assigned for each used direction and different cut-off/cross-over frequencies can be used for the different directions.

b) different cut-off/cross-over frequency for user's two ears (e.g. different $f_{xo}$ in different parts $12_L$, $12_R$), or c) different cut-off/cross-over frequencies for different parts $12_L$, $12_R$, separately determined for each of the audio sources in a different direction i.e. a combination of both a) and b).

Adaptation may be done based on both, the spatial content directions and direction of the potentially disturbing environmental noises The cut-off/cross-over frequencies for different parts $12_L$, $12_R$ can be set separately.

In some examples, optimal cut-off/cross-over frequencies for different environments 100 and/or content (or content type) of the audio signals 2 rendered to the user 200 are pre-determined and stored in a database in a memory. During operation of the apparatus 10, the cut-off/cross-over frequency is read from the database based on combinations of parameters representing different combinations of environments 100 and/or content of the audio signals 2.

The automatic changing of a cut-off/cross-over frequency can therefore be based on pre-stored characteristics. Pre-stored characteristics can be combined by maximizing the cross-over frequency.

Environment detection can use environmental values 52 from various sensors 50 such as, for example, noise sensors 50B. The sensors 50 can use sensing hardware such as, for example, a microphone 53, gyroscope, accelerometer, proximity detector, a location detector etc. One example of environment detection is noise sensing 50B (e.g. wind noise detection) using a microphone or microphones 53.

Content detection can use environmental values 52 from various sensors 50 such as speech sensors 50A. The sensors 50 can process data, for example, the audio signals 2 or metadata associated with the audio signals 2. Content type determination can use the metadata associated with the audio signals 2 (if available) or can process the audio signals 2 to determine content or content type algorithmically. For example, speech or music can be disambiguated. For example, the content type can be determined to be stereophonic or binaural spatial audio.

In one use case, content (or content type) of the audio signals 2 rendered to the user 200 is spatial audio content. The user 200 is listening to spatial audio content using the head-mounted audio output apparatus 10. The spatial audio content comprises audio sources/objects that have been placed in different directions around the user 200. The user 200 hears music content from the left and speech content from the right (a phone call with a friend). In this case, the cut-off/cross-over frequency is set separately for the different content types. That is, the cut-off/cross-over frequency for the music content is set according to what is optimal for music listening and the cross-over frequency for the speech is set according to what is optimal for the speech signal.

In another use case, the user is in a noisy environment 100. The noise source is to the right of the user 200 and impacts mainly how the user 200 hears speech content. The noise may be, for example, wind noise that is affecting only the right air-conduction transducer $22_2$ (see FIG. 3). In this case, the cut-off/cross-over frequency is adjusted (made higher) due to the noise only for the right transducers $22_1$, $22_2$ (see FIG. 3). The cut-off/cross-over frequency is not adjusted for the left transducers $22_3$, $22_4$ (see FIG. 3).

FIG. 7 shows a block diagram for an example use case. Here the cut-off/cross-over frequency is adjusted based on the presence of speech content in the content of the audio signals 2 rendered to the user 200.

Content sensing block 50A implements speech sensing and detection using speech detection methods. One example is to extract features, such as mel-frequency cepstral coefficients (MFCCs), from the content of the audio signal 2 and feed these into a classifier (Gaussian Mixture Model (GMM) classifier, for example) for classification to speech and non-speech parts. The GMM classifier is prior-trained on a large database of speech/non-speech data. Neural networks could also be used to build a classifier.

The cut-off/cross-over frequency determination block 40 (this corresponds to the filter controller 40) looks at the classifier output and sets the cut-off frequency (cross-over frequency in this example) to the value that is determined in a stored database. For this example, the cut-off frequencies may be set to 150 Hz for no speech and 2 kHz for speech.

FIG. 7 shows a block diagram for another example use case. Here the cut-off/cross-over frequency is adjusted based on the presence of wind noise in the environment 100.

The environment noise sensing block 50B processes sound recorded by an environmental microphone 53 and determines in which (if any) parts of the frequency spectrum wind noise is present. This may be done by comparing, frequency band-wise, level differences in microphone signals captured by spatially separated the microphones 53, for example, microphones 53 on the different left and right parts $12_L$, $12_R$. If the level difference in a frequency band is over a threshold e.g. 6 dB, this band is considered to contain wind noise.

The cut-off/cross-over frequency is set by the cut-off/cross-over frequency determination block 40 (this corresponds to the filter controller 40) so that the highest frequency band that contains wind noise is 'covered' by the bone-conduction channel. For example, if a frequency band, let's say 500 Hz-1 kHz is the highest which contains wind noise, the cut-off/cross-over frequency is increased to 1 kHz. If no wind-noise is present the cut-off frequency is maintained at 150 Hz.

FIG. 7 shows a block diagram for another example use case where the cut-off/cross-over frequency is adjusted based on both the presence of speech content in the content of the audio signals 2 rendered to the user 200 and also the presence of wind noise in the environment 100.

The cut-off/cross-over frequency is set to the highest one of the two values determined by the two separate use cases described above for FIG. 7. That is, both the wind-noise dependent cut-off/cross-over frequency and the speech content dependent cut-off/cross-over frequency are determined as in the previous examples at cut-off/cross-over frequency determination block 40 and the highest one of these is used as the cut-off/cross-over frequency of the filter.

It will therefore be appreciated that the apparatus 10 comprises means for:

adaptively filtering audio output channels 30 for rendering separately via a head-positioned audio output device comprising automatically changing a cut-off frequency of at least a first filter 24 of a first audio output channel 30.

Figure 8:
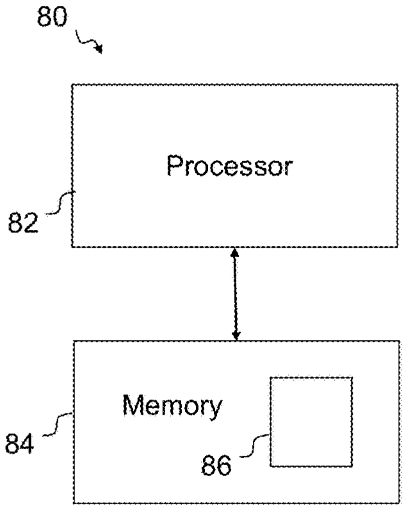
FIG. 8 shows another example of the subject matter described herein.

FIG. 8 illustrates an example of a controller 80. Implementation of a controller 80 may be as controller circuitry. The controller 80 may be implemented in hardware alone, have certain aspects in software including firmware alone or can be a combination of hardware and software (including firmware).

As illustrated in FIG. 8 the controller 80 may be implemented using instructions that enable hardware functionality, for example, by using executable instructions of a computer program 86 in a general-purpose or special-purpose processor 82 that may be stored on a computer readable storage medium (disk, memory etc) to be executed by such a processor 82.

The processor 82 is configured to read from and write to the memory 84. The processor 82 may also comprise an output interface via which data and/or commands are output by the processor 82 and an input interface via which data and/or commands are input to the processor 82.

The memory 84 stores a computer program 86 comprising computer program instructions (computer program code) that controls the operation of the apparatus 10 when loaded into the processor 82. The computer program instructions, of the computer program 86, provide the logic and routines that enables the apparatus to perform the methods illustrated and described. The processor 82 by reading the memory 84 is able to load and execute the computer program 86.

The apparatus 10 therefore comprises:

a hybrid audio system 20 comprising multiple transducers 22 configured to render sound for a user 200 of the apparatus 10 into different audio output channels 30, at least one processor 82; and at least one memory 84 including computer program code the at least one memory 84 and the computer program code configured to, with the at least one processor 82, cause the apparatus 10 at least to perform:

automatically changing a cut-off frequency of one or more audio output channels 30 in dependence upon the one or more transducers 22 associated with the respective one or more audio output channels 30.

Figure 9:
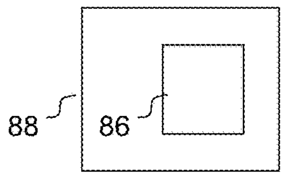
FIG. 9 shows another example of the subject matter described herein.

As illustrated in FIG. 9, the computer program 86 may arrive at the apparatus 10 via any suitable delivery mechanism 88. The delivery mechanism 88 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 86. The delivery mechanism may be a signal configured to reliably transfer the computer program 86. The apparatus 10 may propagate or transmit the computer program 86 as a computer data signal.

Computer program instructions for causing an apparatus to perform at least the following or for performing at least the following:

The computer program 86 that when run on at least one processor of an audio output apparatus 10 comprising a hybrid audio system 20 comprising multiple transducers 22 configured to render sound for a user 200 of the apparatus 10 into different audio output channels 30, causes an automatic change of a cut-off frequency of one or more audio output channels 30 in dependence upon the one or more transducers 22 associated with the respective one or more audio output channels 30.

The computer program instructions may be comprised in a computer program, a non-transitory computer readable medium, a computer program product, a machine readable medium. In some but not necessarily all examples, the computer program instructions may be distributed over more than one computer program.

Although the memory 84 is illustrated as a single component/circuitry it may be implemented as one or more separate components/circuitry some or all of which may be integrated/removable and/or may provide permanent/semi-permanent/dynamic/cached storage.

Although the processor 82 is illustrated as a single component/circuitry it may be implemented as one or more separate components/circuitry some or all of which may be integrated/removable. The processor 82 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGs may represent steps in a method and/or sections of code in the computer program 86. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The apparatus 10 can be a module.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. A head-mounted audio output apparatus comprising:

at least one hybrid audio system comprising multiple transducers, wherein the hybrid audio system is configured to render sound for a user of the head-mounted audio output apparatus into different audio output channels using different associated transducers of the multiple transducers;

at least one processor; and at least one memory including computer program code, the at least one memory and the computer program code configured to, with the at least one processor, cause the apparatus to perform at least the following:

change, responsive to a relationship between an environmental value and a threshold, a cut-off frequency of at least a first one of the audio output channels in dependence upon the transducer associated with the first one of the audio output channels, wherein the threshold is based on one or more properties, comprising an energy spectrum or audio content, of at least the first one of the audio output channels.

2. The head-mounted audio output apparatus as claimed in claim 1, wherein the cut-off frequency of the first one of the audio output channels is changed in dependence on at least a sensed environmental value at a position of the head-mounted audio output apparatus.

3. The head-mounted audio output apparatus as claimed in claim 1, wherein a cross-over frequency of the first one of the audio output channels and a second one of the audio output channels is changed.

4. The head-mounted audio output apparatus as claimed in claim 3, wherein the cross-over frequency between a lower frequency audio output channel and a higher frequency audio output channel is increased such that a bandwidth of the lower frequency audio output channel increases and a bandwidth of the higher frequency audio output channel decreases.

5. The head-mounted audio output apparatus as claimed in claim 1, further configured to render sound into a bone-conduction audio output channel using an associated bone-conduction transducer and an air-conduction audio output channel using an associated air-conduction transducer, wherein the first one of the audio output channels is the bone-conduction audio output channel.

6. The head-mounted audio output apparatus as claimed in claim 1, further configured to render sound for a left ear of a user into a first audio output channel using an associated first transducer and into a second audio output channel using an associated second transducer and is configured to render sound for a right ear of the user into a third audio output channel using an associated third transducer and into a fourth audio output channel using an associated fourth transducer.

7. The head-mounted audio output apparatus as claimed in claim 6, wherein a first set of different audio output channels comprising the first audio output channel and the second audio output channel and a second set of different audio output channels comprising the third audio output channel and the fourth audio output channel are controlled to render one or more audio objects.

8. The head-mounted audio output apparatus as claimed in claim 1, wherein the cut-off frequency of the first one of the audio output channels is changed in dependence upon a dynamic assessment of one or more of:

one or more properties of the audio output channels;

audio content; or an environment of the user.

9. A head-mounted audio output apparatus as claimed in claim 8, wherein the cut-off frequency of the first one of the audio output channels is changed to increase a bandwidth of the first one of the audio output channels, in dependence upon impairment of a second one of the audio output channels.

10. The head-mounted audio output apparatus as claimed in claim 1, wherein the cut-off frequency of the first one of the audio output channels is changed to optimize for hearability.

11. The head-mounted audio output apparatus as claimed in claim 1, wherein the cut-off frequency of the first one of the audio output channels is changed in dependence upon spectral analysis of exterior noise.

12. The head-mounted audio output apparatus as claimed in claim 1, wherein the cut-off frequency of the first one of the audio output channels is changed in dependence upon a dynamic assessment of one or more of sensor output; noise; content for rendering.

13. The head-mounted audio output apparatus as claimed in claim 1, wherein the cut-off frequency of the first one of the audio output channels is changed in dependence upon at least one of:

(i) dynamic assessment of content for rendering as private content and a local environment as a public environment;

(ii) dynamic assessment of content for rendering as comprising speech and a local environment as a noisy environment;

(iii) dynamic assessment of a local environment as an environment subject to wind noise; or (iv) dynamic assessment of content for rendering as spatial audio content to be rendered from different directions and assessment of a local environment as a noisy environment in some but not all directions.

14. The head-mounted audio output apparatus as claimed in claim 1, wherein the cut-off frequency is changed in response to detecting that the environmental value exceeds the threshold.

15. A non-transitory computer readable medium comprising program instructions for causing an apparatus to perform at least the following:

rendering sound in a head-mounted audio output apparatus into different audio output channels; and causing an automatic change, responsive to a relationship between an environmental value and a threshold, of a cut-off frequency of one or more audio output channels in dependence upon one or more transducers associated with respective ones of the one or more audio output channels, wherein the threshold is based on one or more properties, comprising an energy spectrum or audio content, of at least one of the one or more audio output channels.

16. A method comprising:

rendering sound in a head-mounted audio output apparatus into different audio output channels; and causing an automatic change of a cut-off frequency of at least a first one of one or more audio output channels in dependence upon one or more transducers associated with respective ones of the one or more audio output channels and a dynamic assessment of one or more of: one or more properties of the one or more audio output channels, audio content of the one or more audio output channels, or an environment of a user of the head-mounted audio output apparatus, wherein the cut-off frequency of the first one of the one or more audio output channels is caused to change to increase a bandwidth of the first one of the one or more audio output channels, in dependence upon impairment of a second one of the one or more audio output channels.

17. The method as claimed in claim 16, wherein the cut-off frequency of the first one of the audio output channels is changed in dependence on at least a sensed environmental value at a position of the head-mounted audio output apparatus.

18. The method as claimed in claim 16, further comprising:

causing an automatic change of a cut-off frequency of at least the first one of the one or more audio output channels and a second one of the one or more audio output channels in dependence upon the one or more transducers associated with respective ones of the one or more audio output channels.

19. The method as claimed in claim 18, wherein one of the first one of the one or more audio output channels or the second one of the one or more audio output channels comprises a lower frequency audio output channel and another one of the first one of the one or more audio output channels or the second one of the one or more audio output channels comprises a higher frequency audio output channel, and wherein the cross-over frequency between the lower frequency audio output channel and the higher frequency audio output channel is increased such that a bandwidth of the lower frequency audio output channel increases and a bandwidth of the higher frequency audio output channel decreases.

20. The method as claimed in claim 16, further comprising:

rendering sound into a bone-conduction audio output channel using an associated bone-conduction transducer and an air-conduction audio output channel using an associated air-conduction transducer, wherein the bone-conduction audio output channel comprises the first one of the one or more audio output channels.

* * * * *